US009639830B2

(12) United States Patent
Rodriguez et al.

(10) Patent No.: US 9,639,830 B2
(45) Date of Patent: May 2, 2017

(54) METHODS, SYSTEMS, AND DEVICES TO DYNAMICALLY CUSTOMIZE ELECTRONIC BILL PRESENTMENT AND PAYMENT WORKFLOWS

(71) Applicant: Aliaswire, Inc., Burlington, MA (US)

(72) Inventors: Alexander Rodriguez, Dorchester, MA (US); Hossein Mohsenzadeh, Lexington, MA (US)

(73) Assignee: Aliaswire, Inc., Burlington, MA (US)

( * ) Notice: Subject to any disclaimer, the term of this patent is extended or adjusted under 35 U.S.C. 154(b) by 0 days.

(21) Appl. No.: 14/202,385

(22) Filed: Mar. 10, 2014

(65) Prior Publication Data

US 2015/0254617 A1    Sep. 10, 2015

(51) Int. Cl.
| | |
|---|---|
| *G07F 19/00* | (2006.01) |
| *G06F 9/44* | (2006.01) |
| *G06Q 40/00* | (2012.01) |
| *G06Q 20/10* | (2012.01) |
| *G06Q 10/06* | (2012.01) |

(52) U.S. Cl.
CPC ....... *G06Q 20/102* (2013.01); *G06Q 10/0633* (2013.01)

(58) Field of Classification Search
USPC ......................................................... 705/34
See application file for complete search history.

(56) References Cited

U.S. PATENT DOCUMENTS

| | | | | |
|---|---|---|---|---|
| 6,041,306 | A * | 3/2000 | Du ................... | G06F 9/4843 705/7.26 |
| 6,289,322 | B1 * | 9/2001 | Kitchen ............. | G06Q 20/04 705/34 |
| 6,304,857 | B1 * | 10/2001 | Heindel ............. | G06Q 30/04 705/34 |
| 6,493,685 | B1 * | 12/2002 | Ensel ................. | G06Q 20/102 705/34 |
| 7,028,008 | B2 * | 4/2006 | Powar ................ | G06Q 20/02 705/40 |

(Continued)

*Primary Examiner* — Ashford S Hayles
(74) *Attorney, Agent, or Firm* — Parker Ibrahim & Berg LLC; Stephen D. LeBarron

(57) ABSTRACT

Embodiments of systems, methods and devices for electronic bill presentment and payment are disclosed. Such embodiments include receiving one or more instructions from a biller at a remote computer server. Further, the remote computer server implements an electronic bill presentment and payment (EBPP) workflow configuration module and provisions, using the EBPP workflow configuration module, one or more configuration parameters for the biller based on the one or more received instructions. In addition, embodiments include configuring, dynamically an EBPP workflow based on the one or more received instructions and provisioned configuration parameters using the EBPP workflow configuration module. The configuring of the EBPP workflow includes generating a state machine implementing the EBPP workflow. Moreover, embodiments include configuring one or more business logic scripts by the EBPP workflow configuration module to implement the EBPP workflow as well as configuring one or more view templates by the EBPP workflow configuration module to implement the EBPP workflow.

27 Claims, 15 Drawing Sheets

(56) References Cited

U.S. PATENT DOCUMENTS

| | | | |
|---|---|---|---|
| 7,181,686 B1* | 2/2007 | Bahrs | G06F 8/38 715/210 |
| 7,620,602 B2* | 11/2009 | Jakstadt | G06Q 20/10 705/35 |
| 7,653,545 B1* | 1/2010 | Starkie | G10L 15/22 704/257 |
| 7,848,972 B1* | 12/2010 | Sharma | G06Q 20/102 705/34 |
| 8,332,864 B2* | 12/2012 | Bose | G06Q 10/10 718/100 |
| 8,666,859 B2* | 3/2014 | Edwards | G06Q 20/10 705/30 |
| 8,751,384 B2* | 6/2014 | Myklebust | G06Q 20/102 705/40 |
| 2001/0032181 A1* | 10/2001 | Jakstadt | G06Q 20/10 705/40 |
| 2001/0037295 A1* | 11/2001 | Olsen | G06Q 20/102 705/40 |
| 2002/0019808 A1* | 2/2002 | Sharma | G06Q 20/02 705/40 |
| 2002/0026630 A1* | 2/2002 | Schmidt | G06F 8/20 717/103 |
| 2002/0032590 A1* | 3/2002 | Anand | G06Q 10/063 705/7.11 |
| 2002/0040312 A1* | 4/2002 | Dhar | A61J 9/00 705/7.26 |
| 2002/0052840 A1* | 5/2002 | Kitchen | G06Q 20/04 705/40 |
| 2002/0065772 A1* | 5/2002 | Saliba | G06Q 20/10 705/40 |
| 2002/0128968 A1* | 9/2002 | Kitchen | G06Q 20/04 705/40 |
| 2002/0184144 A1* | 12/2002 | Byrd | G06Q 30/04 705/40 |
| 2003/0004872 A1* | 1/2003 | Gardi | G06Q 20/102 705/40 |
| 2003/0004874 A1* | 1/2003 | Ludwig | G06Q 20/102 705/40 |
| 2003/0050885 A1* | 3/2003 | Cohen | G06Q 10/063 705/37 |
| 2003/0083910 A1* | 5/2003 | Sayal | G06Q 10/10 717/102 |
| 2003/0158832 A1* | 8/2003 | Sijacic | G06F 8/34 |
| 2003/0191701 A1* | 10/2003 | Haseltine | G06Q 20/102 705/34 |
| 2003/0191711 A1* | 10/2003 | Jamison | G06Q 20/04 705/40 |
| 2003/0220871 A1* | 11/2003 | Clarke | G06Q 30/04 705/40 |
| 2004/0002907 A1* | 1/2004 | Tosswill | G06Q 30/04 705/34 |
| 2004/0002919 A1* | 1/2004 | Tosswill | G06Q 20/10 705/40 |
| 2004/0059673 A1* | 3/2004 | Kitchen | G06Q 20/04 705/40 |
| 2004/0064387 A1* | 4/2004 | Clarke | G06Q 30/04 705/34 |
| 2004/0078373 A1* | 4/2004 | Ghoneimy | G06Q 99/00 |
| 2004/0083167 A1* | 4/2004 | Kight | G06Q 20/04 705/40 |
| 2004/0111337 A1* | 6/2004 | Feeney | G06Q 10/087 705/28 |
| 2004/0123117 A1* | 6/2004 | Berger | H04L 63/1408 713/188 |
| 2004/0128001 A1* | 7/2004 | Levin | G05B 17/02 700/31 |
| 2004/0133514 A1* | 7/2004 | Zielke | G06Q 20/10 705/40 |
| 2004/0135805 A1* | 7/2004 | Gottsacker | G06F 17/211 715/751 |
| 2004/0210520 A1* | 10/2004 | Fitzgerald | G06Q 20/04 705/40 |
| 2005/0187872 A1* | 8/2005 | Schmidt | G06Q 20/102 705/40 |
| 2006/0041525 A1* | 2/2006 | Manfredi | G06F 9/44 |
| 2006/0136924 A1* | 6/2006 | Sadiq | G06Q 10/10 718/104 |
| 2006/0155640 A1* | 7/2006 | Kennedy | G06Q 20/10 705/39 |
| 2006/0288332 A1* | 12/2006 | Sagar | G06F 9/526 717/124 |
| 2007/0027801 A1* | 2/2007 | Botzer | G06Q 10/10 705/39 |
| 2007/0061777 A1* | 3/2007 | Vashi | G06Q 30/00 717/113 |
| 2007/0142935 A1* | 6/2007 | Danielsson | G06F 8/10 700/29 |
| 2007/0156487 A1* | 7/2007 | Sanabria | G06F 9/4428 705/7.26 |
| 2007/0174101 A1* | 7/2007 | Li | G06Q 10/06 705/7.26 |
| 2007/0203760 A1* | 8/2007 | Schmidt | G06Q 20/102 705/4 |
| 2007/0244904 A1* | 10/2007 | Durski | G06F 8/30 |
| 2008/0010200 A1* | 1/2008 | Smith | G06Q 20/105 705/41 |
| 2008/0162498 A1* | 7/2008 | Omoigui | G06F 17/3089 |
| 2008/0183537 A1* | 7/2008 | Bangel | G06Q 10/06 705/7.26 |
| 2008/0256508 A1* | 10/2008 | Jonsson | G06F 8/10 717/104 |
| 2008/0270201 A1* | 10/2008 | Flaxer | G06Q 10/06 705/7.29 |
| 2009/0006320 A1* | 1/2009 | Ding | G06Q 10/06 |
| 2009/0043689 A1* | 2/2009 | Yang | G06Q 20/102 705/38 |
| 2009/0144186 A1* | 6/2009 | Debarre | G06Q 40/04 705/37 |
| 2009/0222817 A1* | 9/2009 | Faatz | G06Q 10/06 718/100 |
| 2010/0228683 A1* | 9/2010 | Ansley | G06F 8/00 705/348 |
| 2010/0242013 A1* | 9/2010 | Hao | G06Q 10/06 717/102 |
| 2011/0004538 A1* | 1/2011 | Botzer | G06Q 10/10 705/35 |
| 2011/0178980 A1* | 7/2011 | Wagner | G06Q 20/00 707/607 |
| 2011/0251952 A1* | 10/2011 | Kelly | G06Q 20/14 705/40 |
| 2013/0060596 A1* | 3/2013 | Gu | G06Q 10/06 705/7.27 |
| 2013/0219217 A1* | 8/2013 | Seren | G06F 11/3664 714/27 |
| 2013/0268434 A1* | 10/2013 | Mohsenzadeh | G06Q 20/14 705/40 |
| 2014/0337071 A1* | 11/2014 | Stiffler | G06Q 10/06311 705/7.13 |
| 2015/0100547 A1* | 4/2015 | Holmes-Higgin | G06F 17/30575 707/610 |

* cited by examiner

1100

| Bills |

Bill Payment

Please confirm that the information on this page is correct.

To report billing errors, please call customer service.

Indicate the amount you wish to pay.

Select a payment method. Use a credit card or a checking account and fill out the relevant information.

Please note that you can not currently make payments. Payments will be enabled shortly.

Bill for BOH Inv

Account ID: 10021411

Invoice Number: INV10021411

Company Name: W SERVICES

Email Receipt To: user@directbiller.com — 1110

Due Date: 06/29/2011

Invoice Amount: $81.31

Balance Due: $81.31

Invoice Description: Invoice details

Make Payment
Make a payment.

Payment Flow Bills — 1410

| | |
|---|---|
| Account ID: | 10021412 |
| Invoice Number: | INV10021412 |
| Customer: | MIKE HANSBERGER |
| Bill Post Date: | 05-14-2013 |
| Bill Due Date: | 06-24-2013 |
| Invoice Amount: | $1.34 |
| Balance Due: | $1.34 |
| Minimum Payment: | $0.00 |
| Invoice Description: | N/A |

[Back] [Pay Bill]

METHODS, SYSTEMS, AND DEVICES TO DYNAMICALLY CUSTOMIZE ELECTRONIC BILL PRESENTMENT AND PAYMENT WORKFLOWS

BACKGROUND

Many businesses present bills to and/or accept payment from clients. Traditionally, businesses have sent invoices through the postal mail as well as received payment for such invoices via postal mail in the form of a check. Recently, financial institutions and electronic financial transaction companies have offered businesses the ability to electronically present bills and accept payments. The presentment and payment can be done over the Internet via a web interface or email. Other scenarios may include accepting payment through an interactive voice response (IVR) system. Further, bill presentment and payment may be performed through mobile devices via a wireless application or text messaging.

However, such electronic bill presentment and payment mechanisms offered by financial institutions and financial transaction companies are not tailored to a specific business. Moreover, a business is usually provided a bill presentment and payment capability that has no customization in both implementing the business's aesthetic online appearance or branding as well as executing custom business logic scripts to conform to the business's customary business practices. A business may be able develop its own electronic bill presentment and payment system. However, such an effort would not be cost-effective or take the advantage of the economies of scale of financial institutions and financial transaction companies implementing electronic bill presentment and payment systems for a plurality of businesses. In addition, a business may have the need to update or customize aspects of its bill presentment and payment system dynamically and in real-time (i.e. runtime). Electronic bill presentment and payment systems offered by financial institutions and financial transaction companies do not provide such dynamic customization.

Accordingly, there is a need for dynamically customizing bill presentment and EBPP workflows.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 11 is an example short presentment of a bill provided by a biller EBPP workflow in accordance with some embodiments.

FIG. 12 is an example long presentment of a bill provided by a biller EBPP workflow in accordance with some embodiments.

FIGS. 13-15 are example views provided by an action state controller and view manager in accordance with some embodiments.

Figure 1:
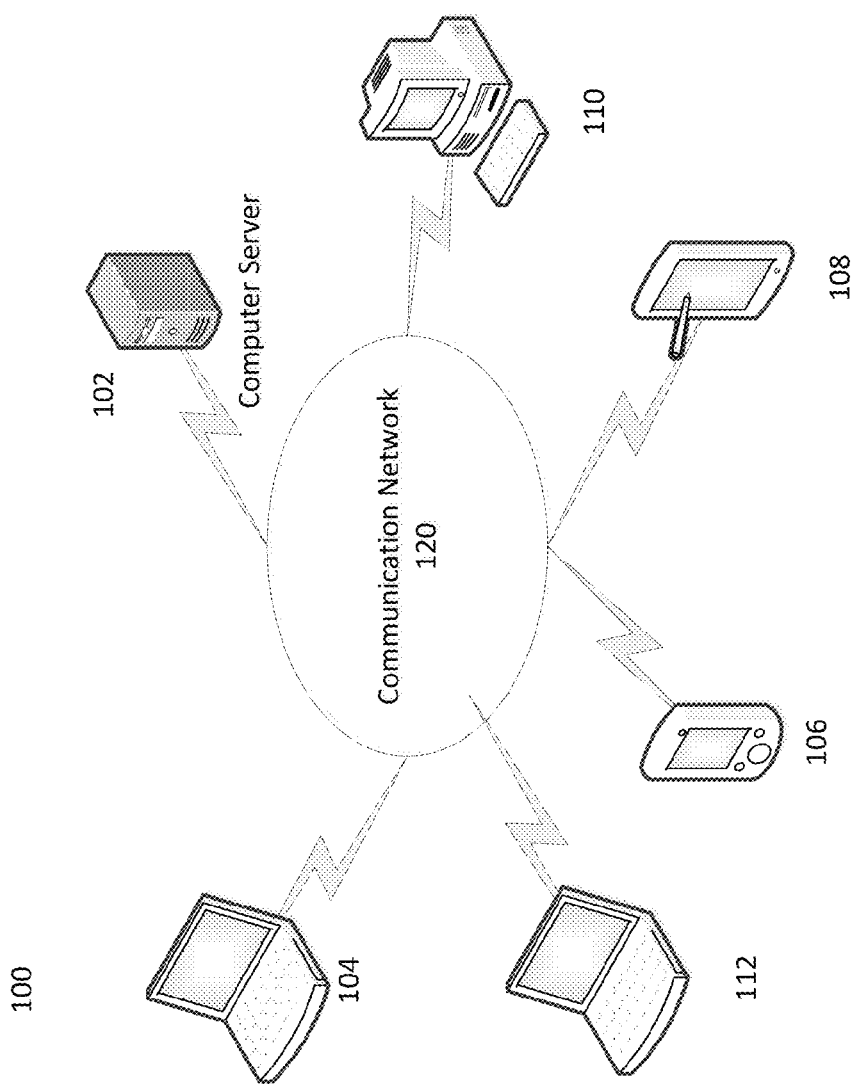
FIG. 1 is a block diagram of a system used to dynamically customize EBPP workflows in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

Embodiments of systems, methods and devices for electronic bill presentment and payment are disclosed. Such embodiments include receiving one or more instructions from a biller at a remote computer server. Further, the remote computer server implements an electronic bill presentment and payment (EBPP) workflow configuration module and provisions, using the EBPP workflow configuration module, one or more configuration parameters for the biller based on the one or more received instructions. In addition, embodiments include configuring, dynamically an EBPP workflow based on the one or more received instructions and provisioned configuration parameters using the EBPP workflow configuration module. The configuring of the EBPP workflow includes generating a state machine implementing the EBPP workflow. Moreover, embodiments include configuring one or more business logic scripts by the EBPP workflow configuration module to implement the EBPP workflow as well as configuring one or more view templates by the EBPP workflow configuration module to implement the EBPP workflow.

Thus, such methods, systems and devices that dynamically execute customized bill present and/or bill EBPP workflows includes receiving one or more instructions from a biller at a remote computer server operated by an intermediate entity. The remote computer server implementing an electronic bill presentment and payment (EBPP) workflow configuration module. In one embodiment, the EBPP workflow configuration module provisions one or more configuration parameters for the biller based on the one or more received instructions. Configuration parameters are a set of features and components within the EBPP module that can be changed, modified, or created to customize the biller's EBPP solution. Examples are turning bill presentment on or off, pre-configured billing models, allowing credit card payments and/or ach payments, allowing recurring payments, uploading custom CSS files to customize the EBPP look and feel, customizing the text on all of the EBPP pages, etc.

In addition, the EBPP workflow configuration module configures dynamically and in real-time a biller EBPP workflow based on the one or more received instructions and provisioned configuration parameters. The biller EBPP workflow includes generating a state machine implementing the biller EBPP workflow. Moreover, the EBPP module executes one or more business logic scripts to configure the biller EBPP workflow.

In other embodiments the biller EBPP workflow can be customized dynamically and in real-time. For example, the aesthetic appearance (look and feel), the page ordering, and the logical processing of user inputs of bill presentment and/or bill acceptance can also be customized dynamically and in real-time. The configuration parameters as well as the biller EBPP workflow and/or EBPP workflow (the biller and EBPP workflow are related to each other such that the EBPP workflow is the portion of the biller EBPP workflow that facilitates the acceptance of payments) may implemented using a set of configuration parameters stored (previously) in systems and devices implementing methods described herein.

FIG. 1 is a block diagram of a system 100 used to dynamically execute customized EBPP workflows in accordance with some embodiments. Such a system 100 includes a computer server 102 coupled to one or more customer computing devices (104, 106, 108, 110) and a biller computing device 112 over a communication network 120. The computer server 102 may implement an electronic bill presentment and payment (EBPP) system that includes an EBPP workflow configuration module that configures the EBPP workflow and an EBPP module that executes the EBPP workflow including presenting bills to and/or accepting bill payments from a customer for a biller. The computing devices (104, 106, 108, 110) may be operated by one or more customers of the biller. Further, computing device 112 may be operated by a biller. Examples of computing devices (104, 106, 108, 110, 112) may include laptop computers, desktop computers, tablet computers, smartphones, telephones, point-of-sale devices, etc. Further, examples of communication network 120 may include the Internet, one or more wide area networks, a local area network, a wireless network, a cellular network, a public telephone network, etc.

In some embodiments, computer server 102 may be operated by a biller. In such embodiments the EBPP system may be developed by a third party and ported to the computer server 102 to be operated and managed by the biller. In other embodiments, the computer server 102 may be operated by an intermediate entity or third party that develops and manages the EBPP system on behalf of the biller. In further embodiments, the computer server 102 may be operated by an intermediate entity or third party such that the EBPP system is configured for one or more billers, each biller configured according to its owns preferences. In alternate embodiments, computer server 102 may be one or more computer servers working as a distributed computer system implements aspects of the EBPP system.

System 100 may dynamically execute customized bill present and/or bill EBPP workflows. Such a system includes a computer server 102 implementing an EBPP system receiving one or more instructions from a biller through a biller computing device 112. The EBPP system on the computer server 102 may display a user interface on the biller computing device 112 to allow the biller to provide the instructions. For example, the EBPP system implemented on the computer server 102 may present a website or web page user interface to the biller computing device 112 through a web browser to allow the biller to provide the instructions.

Further, the EBPP system implemented by the computer server 102 provisions configuration parameters for the biller based on the one or more received instructions. Configuration parameters may include billing models are different mechanisms in which the biller may present bills and/or accept bill payments from a customer. Examples of billing models include, but are not limited to, bill payment without bill presentment, bill payment with short presentment, bill presentment without bill payment, bill presentment with bill payment or any such combination. For example, a long presentment of a bill can be a print-ready, electronic version of a bill, (e.g. PDF) that may include line items, images, and other billing details. Alternatively, for example, a short presentment of a bill provides only limited billing information such as amount due, due date, and the account number being paid. Further, short presentment of bills may be shown directly on a user interface during payment.

In addition, the EBPP system configures dynamically and in real-time a biller EBPP workflow based on the one or more received instructions and provisioned configuration parameters. The biller EBPP workflow may include configuring the mechanism to present and/or accept payment of bills. Different mechanisms may include web, email, text messaging, wireless application, IVR, postal mail, credit card, debit card, gift card, pre-paid card, electronic funds transfer, electronic bank transfer, etc.). Such mechanisms may be further categorized as presentment mechanism or workflows (web, email, text messaging, wireless application, IVR, postal mail, etc.) and payor mechanisms or workflows (credit card, debit card, gift card, pre-paid card, electronic funds transfer, electronic bank transfer, etc.). Thus, EBPP system implemented by computer server 102 may accept payments from a biller customer using a payor workflow based on the biller EBPP workflow.

Moreover, the biller EBPP workflow includes generating a state machine implementing the biller EBPP workflow. Such a state machine manages both the actions executed by the EBPP system and the views presented to a user interface to both a biller and a biller customer by the EBPP system. Further, the EBPP system executes one or more business logic scripts during execution of the biller EBPP workflow. For example, the business logic scripts may include a mechanism to execute custom business logic on behalf of the biller. Examples of types of business logic scripts include but are not limited to groovy, javascript, beanshell, EL, and bsf. In one embodiment, the EBPP system may execute default business logic scripts stored in and executed by computer server 102. In an alternate embodiment, the computer server 102 implementing the EBPP system receives one or more one or more custom business logic scripts from a biller (via the biller computing device 112) to execute within the biller EBPP workflow. Also, in another embodiment, EBPP system configures a user interface design based on the biller EBPP workflow.

In additional embodiments, the computer server 102 implementing the EBPP system receives one or more updated instructions from a biller (via the biller computing device 112) and the EBPP system modifies the biller EBPP workflow, state machine, business logic scripts, payer user interface based on the one or more received updated instructions.

Figure 2:
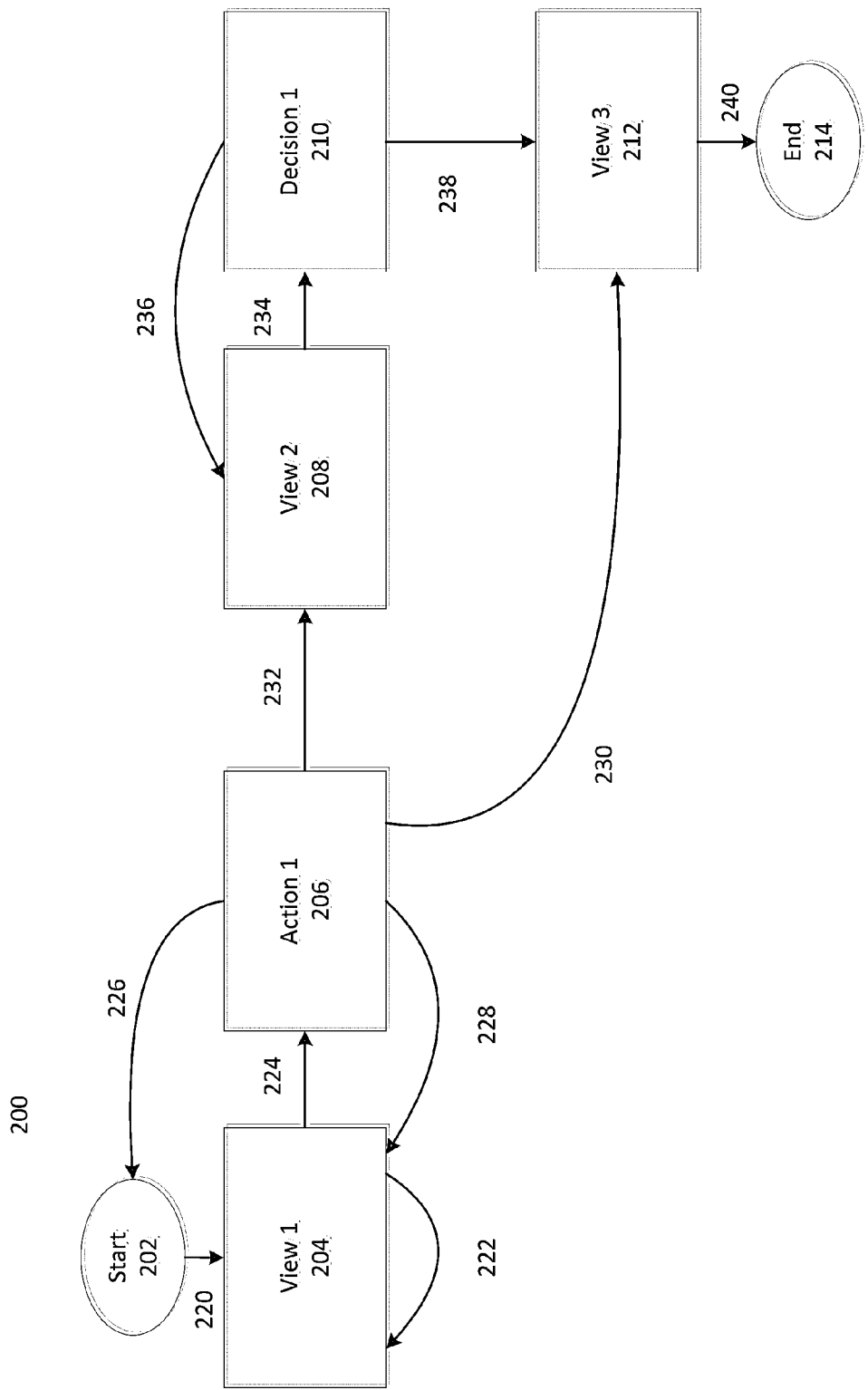
FIG. 2 is a state machine used to dynamically customize EBPP workflows in accordance with some embodiments.

FIG. 2 is a state machine 200 used to dynamically execute customized EBPP workflows in accordance with some embodiments. The customer workflow allows a biller to specify a presentment workflow and/or EBPP workflow. Generally, the custom biller EBPP workflow may be a page flow that directs a sequence of pages of a website or wireless application to present bills or accept payments of bills. Further, the custom biller EBPP workflow may be implemented by the finite state machine 200. The pages and processing within the custom biller EBPP workflow may be states and transitions between states.

During execution of the custom biller EBPP workflow, biller-specific configuration may be loaded from a storage device coupled to a computer server implementing an electronic bill presentment and payment (EBPP) system. Such configuration data may be used to setup the customer biller EBPP workflow, including the presentment workflow(s), EBPP workflow(s), and/or page flows. The state machine 200 uses context data and includes action states, view states, decision states, and end states as well as transitions between states. Context data is data stored in a memory data model representing the data used to configure and execute the EBPP workflow and to display the results of the execution of the EBPP workflow to the end user. Further, the EBPP module may access context data that carries a data model for the workflow. A data model is a representation of data items and interconnections among the data items used by a software application (or any process). Any data necessary to perform business logic processing or to display dynamic data to a customer of the biller is stored in the context. In addition, the context may carry payment data used to perform payment processing.

A transition is the moving from one state to another state in the finite state machine 200. A transition may occur between two action states, between two view states, from an action state to a view state, from a view state to an action state, from a view state to a decision state, from an action state to a decision state, from a decision state to a decision state, from a decision state to an action state, from a decision state to a view state, from a decision state to an end state, from an action state to an end state, and from a view state to an end state.

An action state may be a tightly-scoped, (generally) a single purpose procedure. The EBPP system may configure one or more actions states which execute business logic scripts and determine the next state of the state machine as well as may optionally execute a business logic script received from the biller. Examples of action state may include, but is not limited to, retrieving a list of bills, retrieving multiple bills, saving a biller customer's funding mechanism or making payment. Action states may also execute business logic scripts to process data. Moreover, actions states implement a significant processing of the custom biller EBPP workflow. Management and implementation of the action state processing and state transitions may be performed by an actions state controller.

A view state is a state that displays a user interface to a biller or a customer of a biller and is configured by the EBPP system. Further, a view state is associated with a view that contains one or more view blocks. Each view block may contain static text, (dynamic) data fields, and/or input field. Alternatively, a view state may be associated with a rendering template. A rendering template may be a macro function or script executed by a module used to render a customized display to the end user. A view may also contain logic scripts (e.g. JavaScript) to validate input fields and to validate a form before submission to the computer server. Cascading Style Sheets (CSS) styles may be associated to manipulate the view's layout and style, such as colors and fonts. A view state manager manages and sets the views to be displayed on a user interface for a biller or customer of a biller. Further, the view state manager determines which view/page should be displayed based on the custom biller EBPP workflow, the components of the page, the way in which the data model interacts with the view, and displays the view on the user interface for a biller or customer of a biller.

The EBPP system may configure zero or more decision states which determine the next state of the state machine based on evaluating one or more configuration parameters. A decision state is a state that allows for simple if-then-else routing to another state. A decision state evaluates an expression that returns true or false and transitions to two different states based on the outcome of that evaluation. For example, if the user has bills, transition to the view state that displays bills, otherwise transition to the view state that does not display bills.

The EBPP system configures an end state that completes execution of the EBPP workflow and displays a view. That is, an end state is a final state that allows for cleanup of the biller EBPP workflow execution and then displays a view to the payer. The end state is used to signify the end of the current payment collection process for a payer and to return the user to some start state.

Referring to FIG. 2, the state machine 200 includes a start state 202 and a transition 220 to a view 1 state 204. When view 1 is reset, a reset view self-loop transition 222 is performed on the view 1 state 204. If data submitted via view 1 (displayed on the user interface) is submitted, the state machine 200 transitions 224 from the view 1 state 204 to action 1 state 206.

Action 1 state 206 may then perform a data validation on the submitted data. For example, action state 206 may check whether data was provided to all input fields of view 1. If not, then the state machine 200 transitions 208 from action 1 state 206 back to view 1 state 204 for resubmission of data. Further, data validation may be such that the state machine 200 transitions 226 from action 1 state 206 to the start state 202 based on processing of the submitted data by the action 1. In addition, when data has been successfully validated, the state machine 200 may transition 230 from the action 1 state to the view 3 state. Moreover, when data has been successfully validated, the state machine 200 may transition 232 to view 2 state 208. Although action 1 state 206 validated the data, there may be need to receive more data.

View 2 state 208 provides input fields to a user interface of a biller or customer of the biller. The state machine 200 may transition 234 from view 2 state 208 to decision 1 state 210 by submitting data received from view 2 to be processed by decision 1 state 210. The decision 1 state 210 may validate the submitted data from transition 234. If there is a data validation failure, the state machine may transition 236 from decision 1 state 210 to view 2 state 208. However, if the submitted data is successfully validated, the state machine 200 may transition 240 from decision 1 state 210 to view 3 state 212. Once the view 3 is presented to the user interface, the state machine transitions 240 to an end state 214.

Referring to FIG. 2, the embodiment of the state machine 200 is not limiting and other embodiments of the state machine may have more or less number of states, action states, and view states to implement the custom workflow.

A custom biller EBPP workflow is generated by defining pages or views for a user interface that are needed to execute/implement the biller EBPP workflow. There is a view that defines a start to the biller EBPP workflow and a view that defines the end of the biller EBPP workflow. Further, there may be a number of views in the start view and end view. A state in which the state machine sets up a view is called a view state. Further, generating the custom biller EBPP workflow includes defining action or processing states. Action states are generally executed/implemented in between view states because they process data submitted by a user (e.g. biller or biller customer). The processing of the data allows the state controller to determine the next state (e.g. view or action).

Moreover, the generation of the customer biller EBPP workflow includes defining the transitions between states. For example, transitions may be one view state proceeding to another view state, a view state proceeding to an action state, an action state proceeding to a view state, and/or an action state proceeding to an action state. Transitions may also include a state returning to itself or self-looping (e.g. self-referential transition). The state machine implementing the biller EBPP workflow is customizable using stored configuration data as well as instructions/input and business logic scripts received from the biller and is further configurable dynamically and in real-time.

Business logic processing performs core operations within the biller EBPP workflow. This processing includes checking whether submitted data is validated as well as manipulates submitted data, processing data and making routing decisions, storing data, and setting up information to be displayed to the user (e.g. biller or biller customer). One significant aspect of business logic processing is payment being rendered.

If required, custom business logic can be assigned to be performed during implementation of any of the states. Further, the custom business logic is performed in a sandbox environment to insulate the performance of the custom business logic from other functions of the current biller EBPP workflow or other biller EBPP workflows. Custom business logic may be used to validate user input, make decisions based on that input, retrieve data from the database, save data to the database, route the user to different states, and perform any number of other actions allowed within the sandbox.

Custom business logic used to validate input from the user, manage page transitions, etc. may be executed using a business logic manager module. Custom business logic scripts can be integrated into the customized workflow and attached to specific view state (e.g. page) transitions. During view state (e.g. page) transitions, any custom business logic attached to the transition is executed and may alter the outcome of the view state (e.g. page) transition.

A secure set of helper services and methods is provided to the isolated business logic script manager module for a specific biller that provides access to that biller's data and certain runtime elements. In this way, the business logic scripts that run in the custom biller EBPP workflow do not have unrestricted access to the runtime environment. Additionally, a biller's custom workflow is time and process limited to prevent one biller impacting others.

Figure 3:
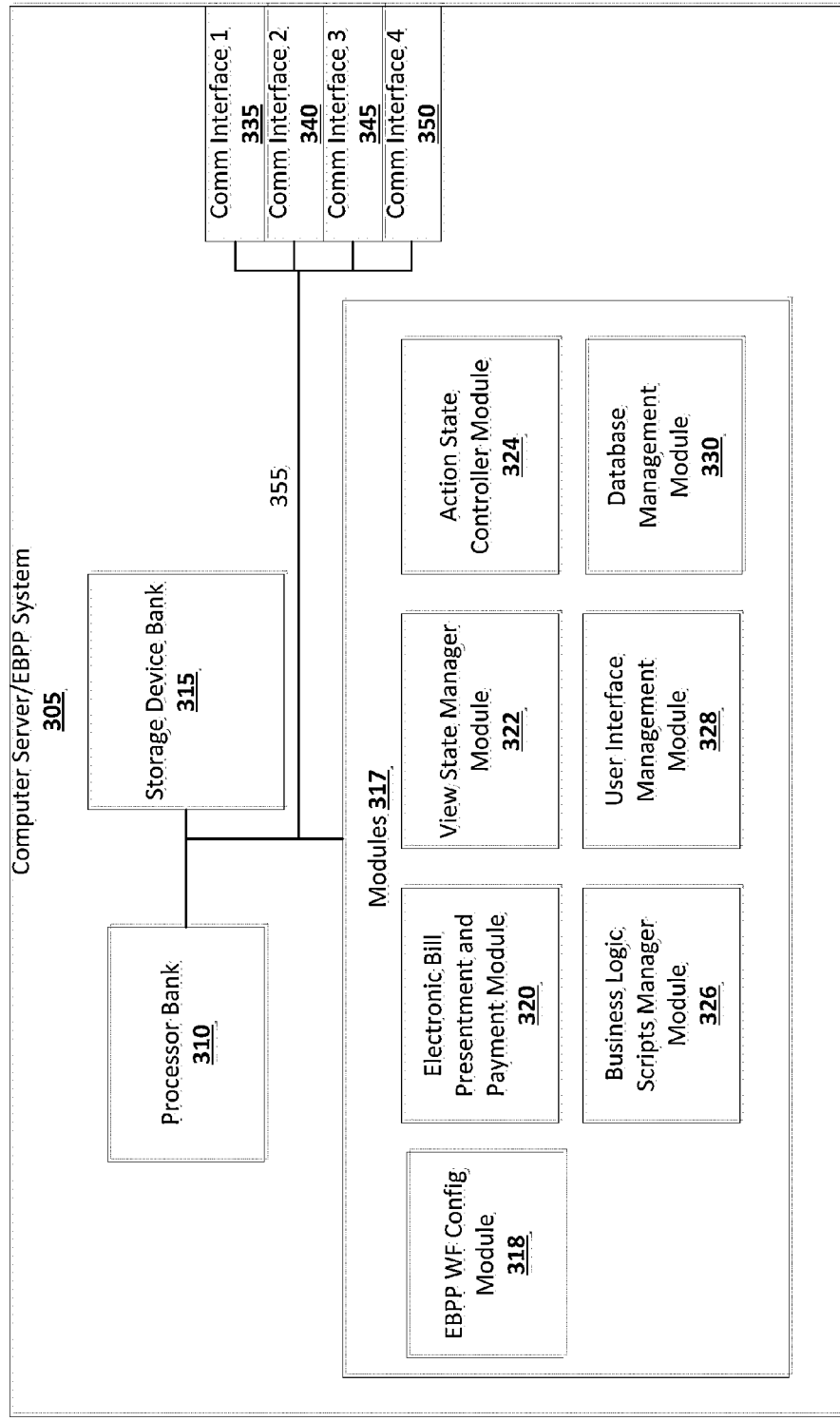
FIG. 3 is block diagram of a device used to dynamically customize EBPP workflows in accordance with some embodiments.

FIG. 3 is block diagram 300 of a device such as a computer server 305 used to dynamically execute customized EBPP workflows in accordance with some embodiments. Such a computer server 305 may be used in a system shown in FIG. 1. The computer server 305 executes and implements an EBPP system that may include several different components such as a processor bank 310, storage device bank 315, one or more software applications, that when executed by a processor from specifically-configured modules (as described herein) 317, and one or more communication interfaces (335-350). In some embodiments the components of computer server 305 may not be located within one computer server 305 but distributed among a plurality of computer servers and/or computing devices.

The processor bank 310 may include one or more processors that may be co-located with each other or may be located in different parts of the computer server 305. The storage device bank 315 may include one or more storage devices. Types of storage devices may include memory devices, electronic memory, optical memory, and removable storage media. The one or more modules 317 may include, an electronic bill presentment and payment (EBPP) workflow (EF) module 318, an EBPP module 320, a view state manager module 322, an state controller 324, a business logic scripts manager 326, a user interface management module 328, and a database management module 330. The modules 317 may be implemented by the one or more processors in the processor bank 310.

The EBPP workflow configuration module 318 dynamically receives input from a biller to configure a custom biller EBPP workflow. That is, in one embodiment, the computer server 305 receives one or more instructions from a biller and forwards the instructions to the EBPP WF configuration module 318. Further, the EBPP WF configuration module 318 provisions one or more configuration parameters for the biller based on the received instructions. In addition, the EBPP WF configuration module 318 configures, dynamically and in real-time, the biller EBPP workflow based on the received instructions and provisioned configuration parameters. The biller EBPP workflow includes generating a state machine implementing the biller EBPP workflow. Moreover, the EBPP module 320 executes one or more business logic scripts to configure the biller EBPP workflow.

The EBPP workflow configuration module 318 further configures one or more business logic scripts by the EBPP workflow configuration module to implement the EBPP workflow. In addition, the EBPP workflow configuration module 318 may configure one or more view templates by the EBPP workflow configuration module to implement the EBPP workflow. Moreover, the EBPP workflow configuration module 318 may configure an action state of the state machine which executes one or more business logic scripts in the EBPP workflow and determines the next state of the state machine. Also, the EBPP workflow configuration module 318 may configure a view state of the state machine which displays a view to the payor.

Further, the EBPP workflow configuration module 318 receives instructions from the biller to setup states, the transitions between states, the custom business logic associated with states, and the custom views associated with view states. Further, the EBPP workflow configuration module 318 imports and exports the biller EBPP workflow configuration, retains multiple versions of the biller EBPP workflow configuration, and provides out of the box states, view templates, and business logic scripts that billers may choose to use and extend.

The EBPP module 320 executes the EBPP workflow configured by the EBPP WF configuration module 318. Moreover, the EBPP module executes one or more business logic scripts to execute the biller EBPP workflow. In some embodiments the modules 317 may be separated or may be integrated in any combination. In one embodiment, the EBPP WF configuration module, business logic scripts manager module, view state manager module, and/or action state controller module 324 may be integrated with the EBPP module 320.

The view state manager module 322 implements a view state manager. Further, a view state manager manages and sets the views to be displayed on a user interface for a biller or customer of a biller in accordance to the biller EBPP workflow. Further, the view state manager determines which view page should be displayed based on the custom biller EBPP workflow, the components of the page, the way in which the data model interacts with the view, and displays the view on the user interface for a biller or customer of a biller.

The action state controller module 324 implements a state machine. A state of the state machine may be an action state, a view state, a decision state, or an end state. Further, management and implementation of the state processing and state transitions may be performed by a state controller.

The business logic scripts manager module 326 manages the business logic scripts used within the biller EBPP workflow. Further, the business logic scripts manager module 326 may be part of or interact with the view state manager module 322 and the state controller module 324. In some embodiments, the view state manager module 322 may execute a business logic script (e.g. to display the online aesthetic appearance of the biller according to a biller business logic script). In such embodiments, the business logic script manager module 326 may access the stored business logic script when instructed by the view state manager module 322. In other embodiments, the state controller module 324 may execute another business logic script (e.g. data validation script). In such embodiments, the business logic script manager module 326 may access the stored business logic script when instructed by the state controller module 324.

Further, the computer server 305 may receive custom business logic scripts from a biller and forward such custom business logic scripts to the business logic scripts manager module 326. In turn, the business logic scripts manager module 326 may store such custom business logic scripts in the storage device bank 315 and manage them accordingly. Moreover, the business logic script manager module 326 may manage default business logic scripts already stored in the storage device bank 315. Such default business logic scripts may be used to implement the biller EBPP workflow when no biller-specific business logic script is provided by the biller for a particular function (e.g. retrieving bills, etc.).

The user interface management module 328 may be implemented in conjunction with the view state management module 322. That is, the view state manager module 322 may process certain data to generate a view of a page (e.g. of a website or wireless application) and provides such view to the user interface management module 328. In turn, the user interface management module 328 communicates the view to a user interface (for a biller or customer of a biller) through one of the communication interfaces (335-350). Alternatively, the user interface management module 328 may receive input data from the user interface (for a biller or customer of a biller) and provides such input data to the view state manager module 322 to be processed.

The database management module 330 manages data stored in the storage device bank 315 as a database. Such data may be data to be displayed in views of one or more pages (e.g. of a website or wireless application) by the view state manager module 322 or to be processed by the state controller module 324 (e.g. processing payments based on stored payment information (credit card information, bank account information, etc.)). Further, such data may be organized in one or more databases for ease of access and processing by the module 317 of the computer server 305.

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (330-345) may be one of several types that include a bus or other communication mechanism.

Figure 4:
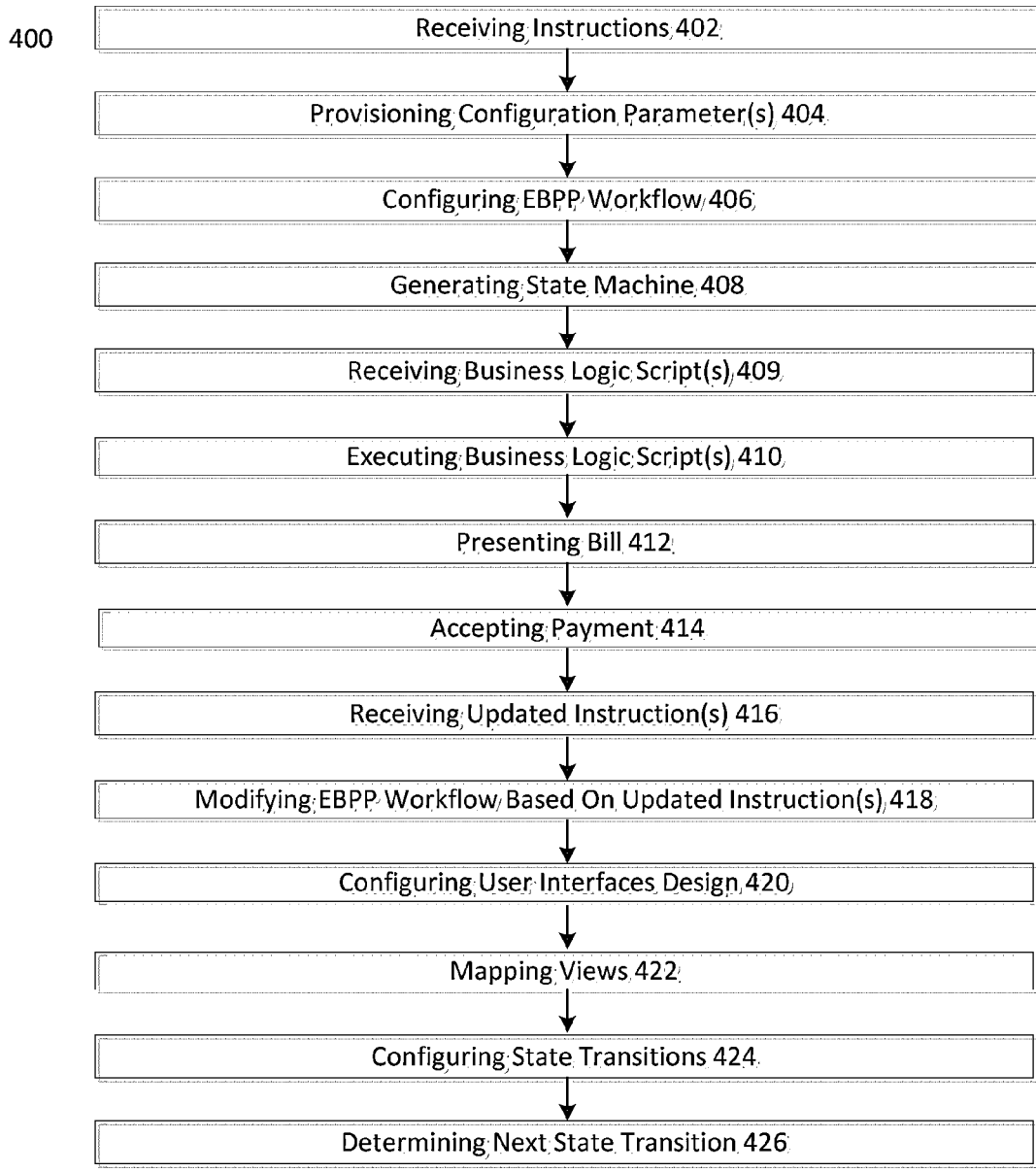
FIG. 4 is a flowchart of a method for dynamically customizing EBPP workflows in accordance with some embodiments.

FIG. 4 is a flowchart of a method 400 that dynamically executes customized EBPP workflows in accordance with some embodiments. The method 400 includes receiving one or more instructions from a biller at a computer server, as shown in block 402. Further, the computer server implements an electronic bill presentment and payment (EBPP) system. In one embodiment the computer server may be operated by the biller and the EBPP system was developed by a third party. In another embodiment, the computer server may be operated by an intermediate entity provide bill presentment and payment capability for one or more biller.

The method 400 further includes provisioning, using an EBPP workflow configuration module, one or more configuration parameters for the biller based on the one or more received instructions, as shown in block 404. In addition, the method 400 includes configuring, dynamically and in real-time, an EBPP workflow (for a biller) based on the one or more received instructions and provisioned configuration parameters using the EBPP module, as shown in block 406. Moreover, configuring the biller EBPP workflow includes generating a state machine to implement the biller EBPP workflow, as shown in block 408. In some embodiments, generating the state machine includes configuring one or more view states and one or more action states. Further, the one or more view states are processed and managed by a view state manager and the one or more actions states are processed and managed by an action state controller.

In one embodiment, the method 400 includes receiving one or more custom business logic scripts from a biller, as shown in block 409. In another embodiment, the computer server may already have default business logic scripts stored in a coupled storage device. The method 400 further includes implementing one or more business logic scripts executed by an EBPP module within the EBPP system (see FIG. 3) to configure the EBPP workflow, as shown in block 410.

The method 400 further includes presenting a bill to a biller customer on a user interface based on the EBPP workflow, as shown in block 412. In addition, the method 400 includes accepting payment from a biller customer using a payor workflow based on the biller EBPP workflow, as shown in block 414. The biller may accept payment by receiving or accepting payment information from a biller customer. Further the bill EBPP workflow may process the payment based on the payment information received from the biller customer. Moreover, the method 400 includes receiving one or more updated instructions from a biller, as shown in block 416 and modifying the biller EBPP workflow, state machine, and/or a payor workflow based on the one or more received updated instructions, as shown in block 418.

The method 400 further includes configuring a user interface design based on the biller EBPP workflow, as shown in block 420. In addition, the method 400 includes mapping one or more views to be displayed on a user interface to the one or more view states, as shown in block 422. Moreover, the method 400 includes configuring one or more state transitions between the one or more states based on the biller EBPP workflow, as shown in block 424. The method 400 also includes determining that the next state in the state machine is an action state and having the state controller implement the next state, as shown in block 426.

Persons of ordinary skill in the art would understand that embodiments may only implement a subset of the aspects of the method 400 and that not all the aspects of method 400 be performed.

Figure 5:
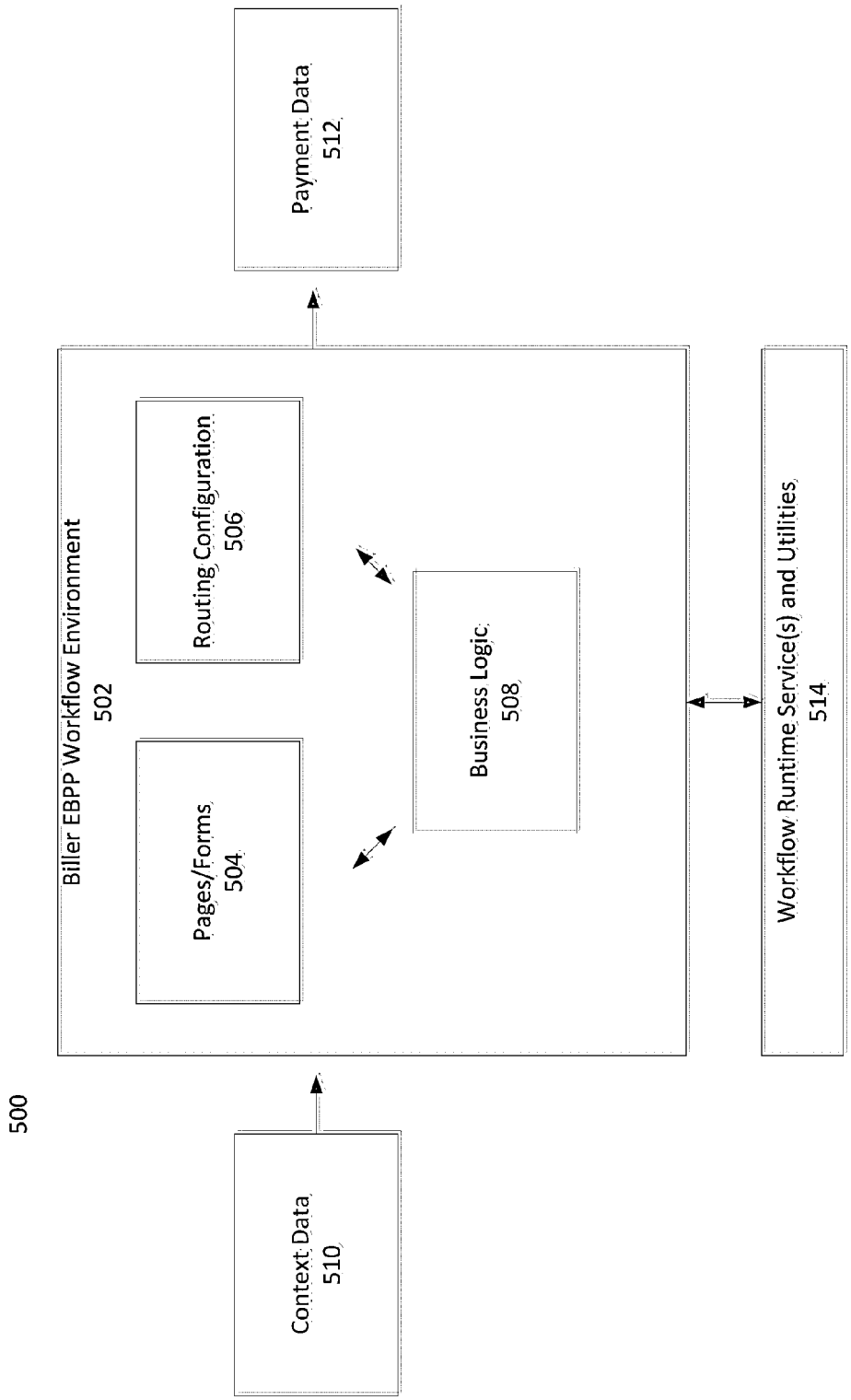
FIG. 5 is a block diagram of a system used to dynamically execute customized EBPP workflows in accordance with some embodiments.

FIG. 5 is a block diagram 500 of a system used to dynamically execute customized EBPP workflows in accordance with some embodiments. The system 500 may be a customizable biller EBPP workflow environment 502 having dependencies on data provided to the system 500 and services provided to the system 500 for the purposes of accessing data, validation, and other common utilities. Such services and the supporting data model provide a secure (e.g. locked down environment) within which the custom biller EBPP workflow can be implemented.

Further, the system 500 provides a virtual runtime environment hosted by a computer server to implement biller-specific configurable workflows. Such a virtual runtime environment allows billers to provide scripts to execute custom business logic, isolate each biller's workflow from other biller EBPP workflows, provide various domain-specific services and utilities as well as access to read and write authorized data, and limits resource utilization (e.g. CPU, memory, etc.) by each biller.

The biller EBPP workflow environment 502 receives context data 510. That is, context data 510 carries the data model for the biller EBPP workflow. This includes any data necessary to perform business logic processing or to display dynamic data to a user (e.g. biller or customer of a biller). Further, the context data may also carry payment data used to perform payment processing.

The biller EBPP workflow environment 502 includes pages/forms 504, routing configuration 506, and business logic 508 (executed by one or more business logic scripts). The business logic executes the biller EBPP workflow with includes displaying pages/forms 504 on a user interface for a biller or customer of a biller. Further, the business logic 508 executes the biller EBPP workflow that includes configuring the routing of payments (e.g. credit card payments to a credit card processing network, online bank account transfer to a financial institution, etc.). Once the routing of the payments is configured, the biller EBPP workflow environment 502 provides payment data to one or more payment processing networks through a payment processing gateway. The biller EBPP workflow may include, but is not limited to, viewing bill account data, viewing bill data, making a payment or multiple payment simultaneously, payment initialization and authorization by separate users, scheduling recurring payments or payment plans, submitting pass-through data. Moreover, workflow runtime services and utilities are provided to and processes data from the biller EBPP workflow environment 502 in accordance to the configured biller EBPP workflow.

Figure 6:
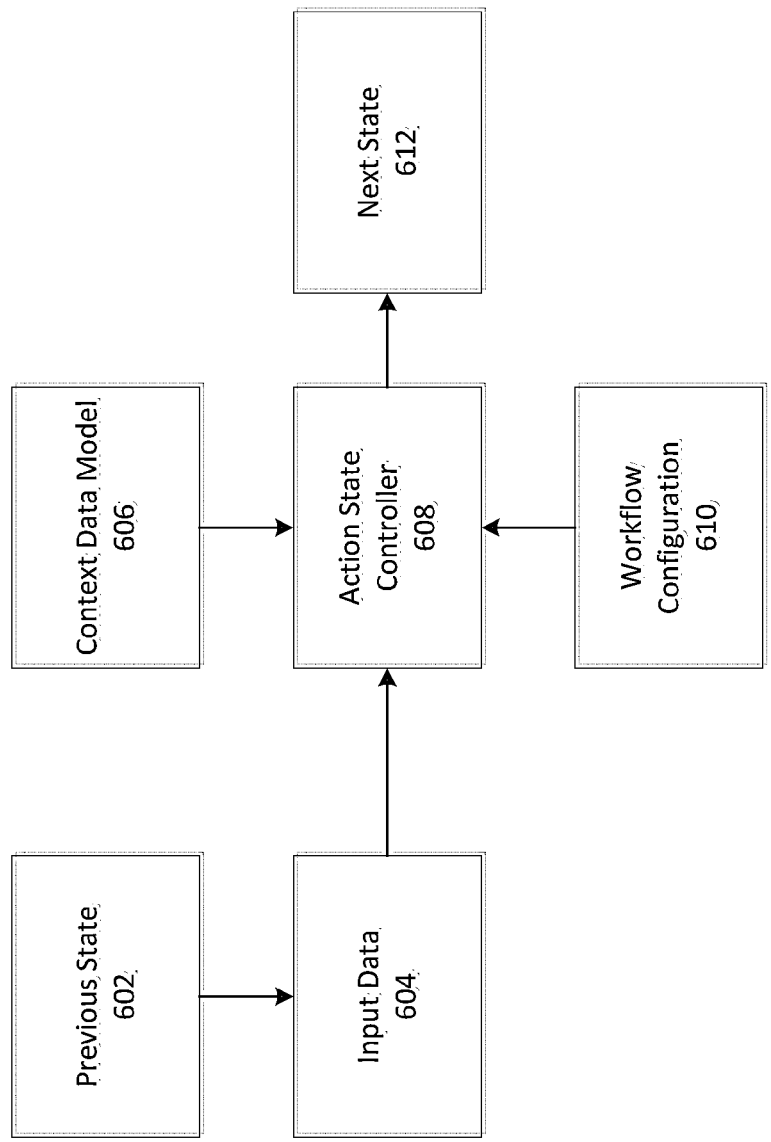
FIG. 6 is a state controller used to dynamically execute customized EBPP workflows in accordance with some embodiments.

FIG. 6 is an action state controller 608 used to dynamically execute customized EBPP workflows in accordance with some embodiments. The state controller 608 may be in an environment 600. Further, the state controller 608 assists in implementing a biller EBPP workflow by implementing at least one of the following. The state controller 608 may determine the current action state based on a previous state 602 and the workflow configuration 610. Note, that the previous state may be an action state or a view state. Further, the state controller may process inputs received from the user interface that includes processing an input request, parsing input data 604 from a user, configuring a data model 606 (e.g. memory representation of data in memory to be displayed to biller or biller customer), and validating input data. In addition, the state controller 608 provides instructions to a sandbox processor to execute the one or more business logic scripts mapped to the current action state. Moreover, the state controller 608 receives a response from the sandbox processor, the response based on the processing the one or more business logic scripts mapped to the current action state. Further, the state controller 608 populates data model based on processing the inputs and the response from the sandbox processor. In addition, the state controller determines the next state 612 in the state machine. In addition, the state controller process actions states to implement biller EBPP workflow configuration 610.

Figure 7:
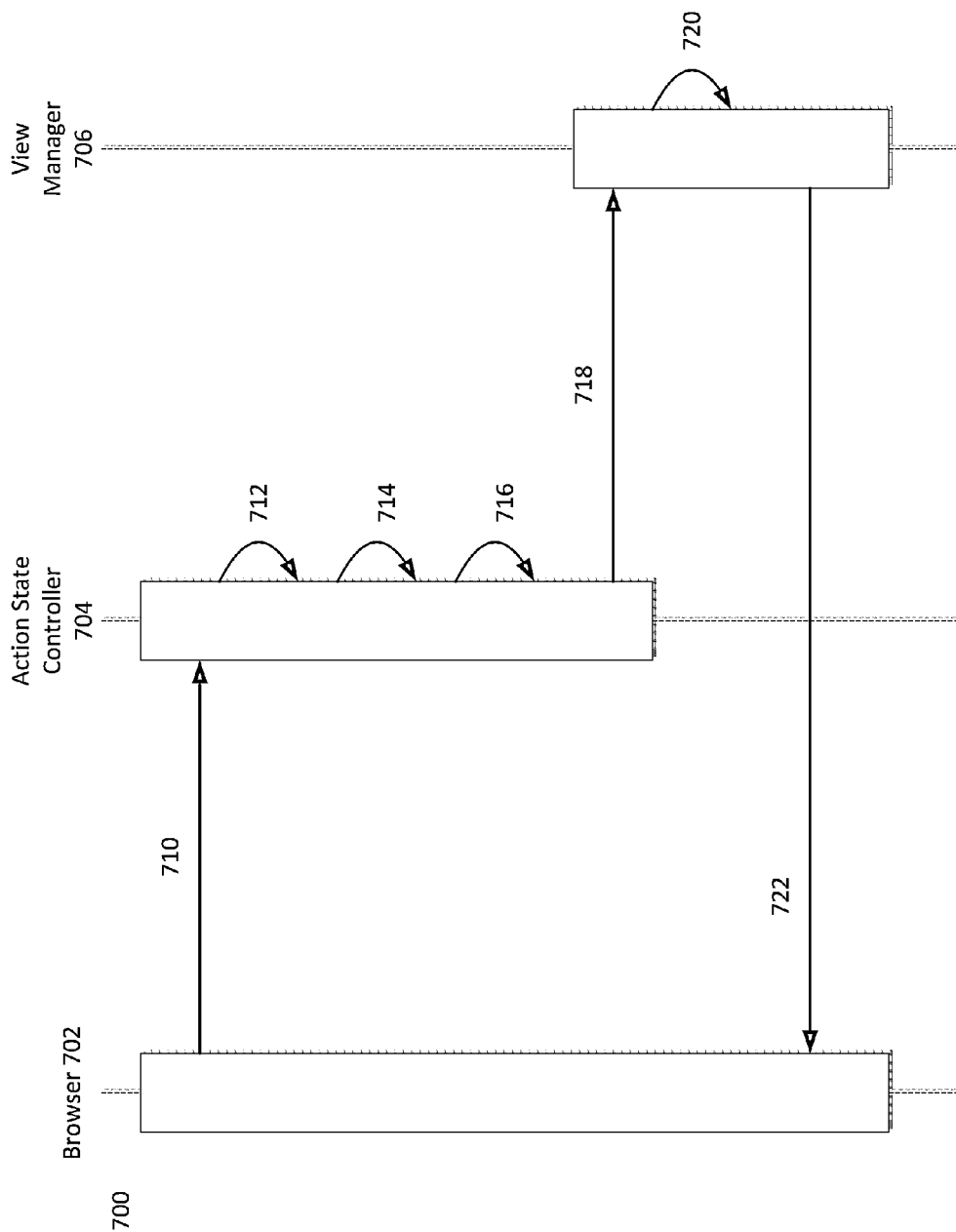
FIG. 7 is a transition state diagram between a browser, state controller, and view manager used to dynamically execute customized EBPP workflows in accordance with some embodiments.

FIG. 7 is a transition state diagram 700 between a browser 702, state controller 704, and view manager 706 used to dynamically execute customize EBPP workflows in accordance with some embodiments. A browser 700 is a user interface for a biller or biller customer to receive bill presentment data and provide payment data to render payment for bills. In other embodiments, the user interface may be of a different type known in the art such as a wireless device user interface. Further, management and implementation of the action state processing and state transitions may be performed by an actions state controller 704. The view state manager 706 sets up views that may be displayed on a user interface for a biller or biller customer. The view state manager 706 determines which view page should be displayed, what view components are part of that page, how the data model should interact with the view, and display the view on the user interface (e.g. browser 702) for a biller or biller customer. The view state manager 706 performs at least one of the following. The view state manager 706 determines the current view state, loads the view configuration for the current view state, determines what display fields as well as what input form elements should be shown on the user interface and populate the according fields with any available data from the data model, layout display and input fields within the view page, attach input fields with an script (e.g. JavaScript) validation, setup any available messages intended for the user, add any page-level script (e.g. JavaScript), add any default and biller custom CSS styles, and display view on the user interface to a biller or biller customer.

Referring to FIG. 7, the transition diagram 700 shows a sequence of steps that occurs when a user (e.g. biller or biller customer) interacts with or submits a request. A user may be starting a new EBPP workflow or looking at a view associated with a view state in the browser 702. The user submits a request to an state controller 704 which performs action state processing but also relinquishes control to the view state manager 706 when the current state is a view state. Further, the view state manager sets up the view for the user and display the view to the browser 702.

In one embodiment, the browser 702 (or user interface) receives input from a user (e.g. biller or biller customer) to submit a request 710. This request is forward to the state controller 704 to be processed. Further, the state controller 704 processes the request 712. In addition, the state controller 704 performs a self-loop if it determines the next state is an action state 714. However, if the state controller 704 determines that a next state is a view state 716, the state controller 704 relinquishes or forwards control 718 in implementing the biller EBPP workflow to the view state manager 706. Moreover, the view manager 706 sets up the view 720 (e.g. importing data models and attaching input fields) and then causes the view to be displayed 722 on the browser 702 (e.g. user interface).

Figure 8:
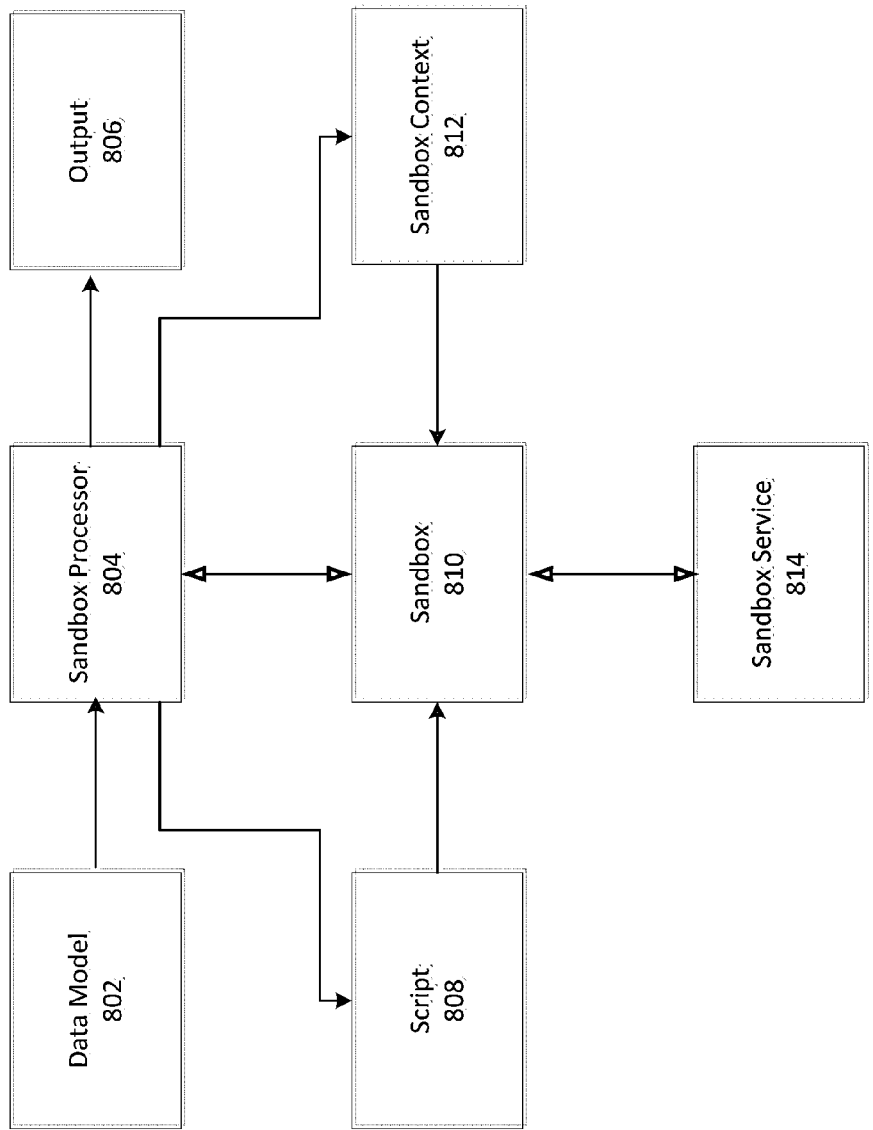
FIG. 8 is a block diagram of sandbox processing used to dynamically execute customized EBPP workflows in accordance with some embodiments.

FIG. 8 is a block diagram of sandbox processing used to dynamically execute customized EBPP workflows in accordance with some embodiments. The biller EBPP workflow is implemented, at least in part, by business logic scripts 808. Static functions are default business logic instructions provided by an EBPP developer. Static functions include common procedures such as bill, account, or other data retrieval, saving funding mechanisms, making payments, etc. Further, custom business logic scripts are provided by the biller. A custom business logic script can be used to provide custom processing of user input, including custom data validation and routing based on that input, custom data persistence, custom data retrieval, etc. In some embodiments, a biller may provide pseudo-code that is translated into a customer business logic script. Further, the configuring the biller EBPP workflow and generating the state machine includes associating business logic scripts with actions defined in the workflow. Further, the scripts are validated for security threats and bugs.

A sandbox processor 804 initializes business logic processing (for a state). The sandbox processor 804 takes the existing data model, populates a sandbox context with data used during business logic processing, sets up a sandbox environment, and begins processing.

Sandbox context 812 contains data used during sandbox business logic processing. The sandbox context 812 provides restricted access to read and write to model data, set messages for the end user, and affect the routing of the state machine.

Sandbox service 814 provides controlled, secured utility methods to access data that might not be available in the sandbox context. It might also provide pre-configured methods for performing calculations such as manipulating amounts, calculating dates, manipulating strings, etc.

Sandbox 810 is responsible for executing static functions and custom business logic scripts in a controlled environment. The sandbox 810 executes the required business logic while controlling access to restricted resources, monitoring memory utilization and CPU utilization, and execution duration. The sandbox 810 performs the following: (1) Initialize a managed thread that may perform the computations; (2) Standard processing—perform standard, pre-configured processing—such as process a request, parse input data from the user (if any), and setup data model 802, and field validation—validate any input data from the user, process any custom validation specified by the biller; (3) Custom processing—execute any custom scripts provided by the biller; (4) Return control to the state controller. The sandbox 810 through the sandbox processor 804 may provide an output or return a result 806.

Sandbox processing is initiated by the state controller. Control is passed to the sandbox processor 804 which executes whatever action(s) are configured for that state. During processing, the sandbox context 812 has a status variable and routing information set by the business logic. This status and routing information is passed back to the state controller which uses that information to determine the next step (state) in the state machine.

Figure 9:
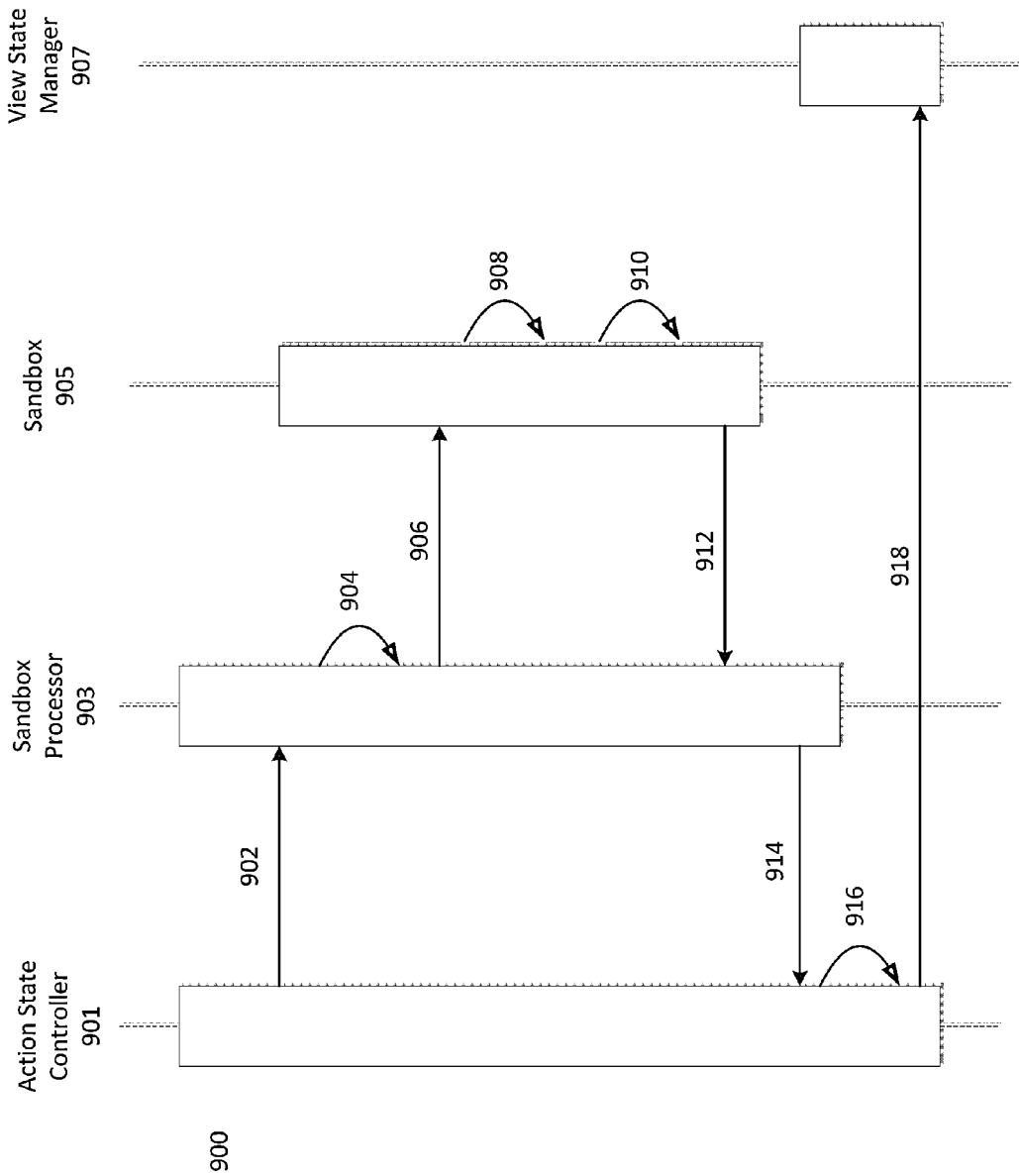
FIG. 9 is a transition state diagram between a state controller, sandbox processor, sandbox, and view manager used to dynamically execute customized EBPP workflows in accordance with some embodiments.

FIG. 9 is a transition state diagram between an state controller 901, sandbox processor 903, sandbox 905, and view manager 907 used to dynamically execute customized EBPP workflows in accordance with some embodiments. The state controller 901 processes data 902 for action state using the sandbox processor 903. Further, the sandbox processor 903 sets up the sandbox context and sandbox environment 904. In addition, the sandbox processor 903 processes the data within the sand box context and sandbox 906. Business logic scripts are executed 908 in the sandbox environment 905. Moreover, routing and status are set 910 in the sandbox environment 905. After which the control is returned 912 from the sandbox environment 905 to the sandbox processor 903 and then control is returned 914 from the sandbox processor 903 to the state controller 901. The state controller 901 then determines whether the next state is a view state 916. If the next state is a view state, then the state controller 901 transitions control to the view state manager 907.

Figure 10:
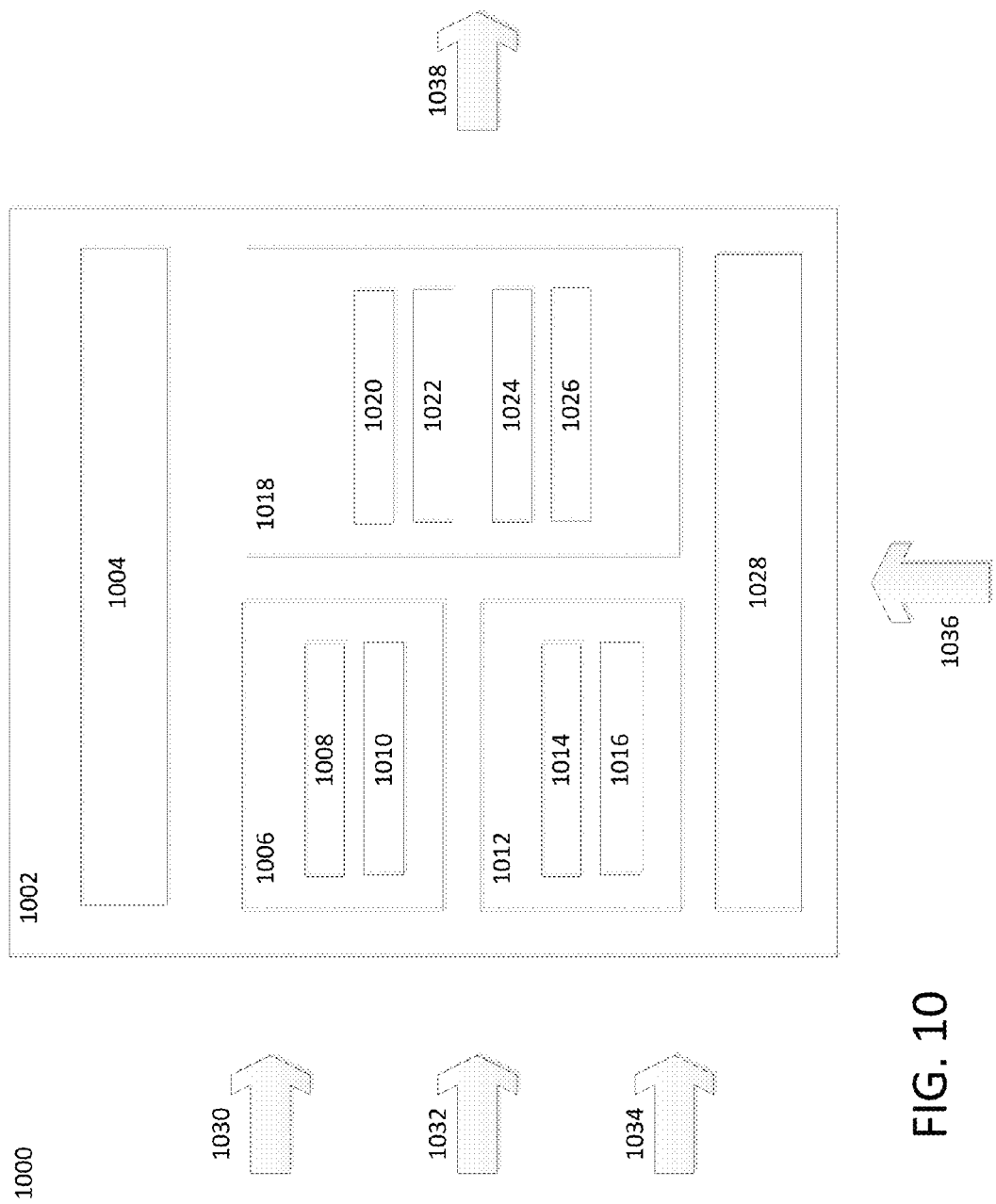
FIG. 10 is a view layout generated when dynamically execute customized EBPP workflows in accordance with some embodiments.

FIG. 10 is a view layout 1000 generated for a custom graphical user interface when dynamically executing custom EBPP workflows in accordance with some embodiments. A custom graphical user interface (GUI) includes widgets, input fields, validators, and pages built using a set of pre-developed components. Such pre-developed components may include default display templates for account, bill, user data, and navigation menus, default input field templates such as amount due, payment date, credit card, bank account, etc., default input field validators for front end and server, default pages such as view bills, view bill, make payment. All default components can be used as initially developed or extended.

A view defines a single UI view to be displayed to a user (e.g. biller or biller customer). A view may acts as a container for other view components. A view block is a view component used to group several other view components together. A view block may contain other view blocks, display and input fields, messages, or static text. Referring to FIG. 10, a view 1002 includes several view blocks (1004, 1006, 1012, and 1018). A display field shows dynamic data that is populated from a data model 1030, to the user (e.g. biller or biller customer). View blocks 1006 and 1012 include display fields (1008, 1010, and 1014) that may be populated from a data model 1030. An input field collects data from the user. An input field might be a text box, a radio button, a checkbox, a drop down box, or any other HTML or other form input element. View block 1018 includes input fields (1020, 1022, 1024, 1026). Static text is text that can be added to a page that is not driven by the data model. This might be help text, labels, advertisements, or instructions. View block 1012 includes static text 1016. Custom business logic scripts provided by the biller (e.g. typically in JavaScript) or default business logic scripts to validate inputs or to validate an entire form when the user submits the form are executed 1028.

CSS 1032 is used to layout and style the view. CSS defines how view blocks are laid out in the view and with relation to each other and what colors and fonts should be used. Messages are displayed to the user to convey information or errors that might have occurred during the last action state processing. View block 1004 may display messages.

Using the biller EBPP workflow configuration, views can be defined with custom layouts and associated with view states. The layout is defined as a view which can contain view block or field sub elements. The view is a high level representation of a view or page which may be displayed to the user. A view block defines a grouping of other elements, such as static text, display fields, or input fields. Thus, a block During rendering the display 1038, the view manager takes the predefined view configuration and lays out the page using very basic html within a template JSP 1036. The existing data model 1030 is used to populate display fields with dynamic content and input fields with default values. Static text and JavaScript are added to the page as necessary. Default and custom CSS styles 1032 are applied to the page. Finally, the page is rendered and displayed to the user 1036.

Setting up a custom GUI includes generating pages, associating pages with view states defined in the biller EBPP workflow, defining view blocks within a page, defining input and display fields, using existing default components (collect credit card, bank account, payment details, etc.) or custom components, adding pass through parameters, account, and/or bill data, associating fields with view blocks and order the fields, adding JavaScript for validating fields and manipulating the view, and associating CSS styles with a page to layout and style view blocks as desired FIG. 11 is an example short presentment 1100 of a bill provided by a biller EBPP workflow in accordance with some embodiments. The short presentment 1100 of a bill may be provided by user interface (e.g. web browser) to a customer of the biller. The short presentment of bill provides limited information 1110 such as the account identifier, invoice number and company name. Further, the short presentment 1100 may allow a customer to provide an email address to receive a receipt of payment. In addition the short presentment 1100 of the bill may include the due date of the bill, the amount of the bill, the balance due on the account, and the invoice description.

Figure 12:
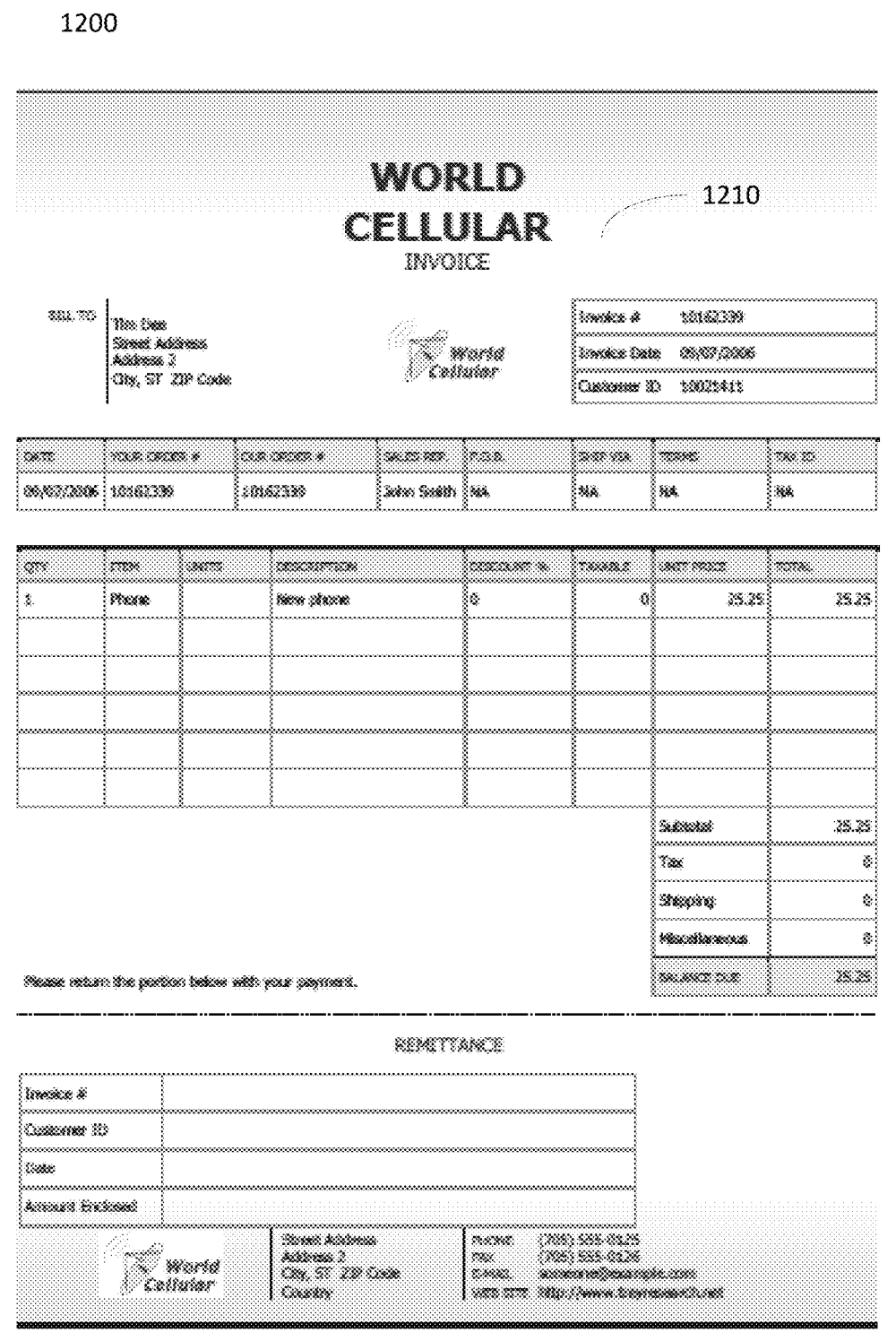

FIG. 12 is an example long presentment 1200 of a bill provided by a biller EBPP workflow in accordance with some embodiments. The long presentment 1200 provides detailed billing information 1210 such as the biller name, customer (e.g. payor) name and address, invoice number, invoice data, customer identifier, line items of billing information and remittance information.

Figure 13:
Figure 15:
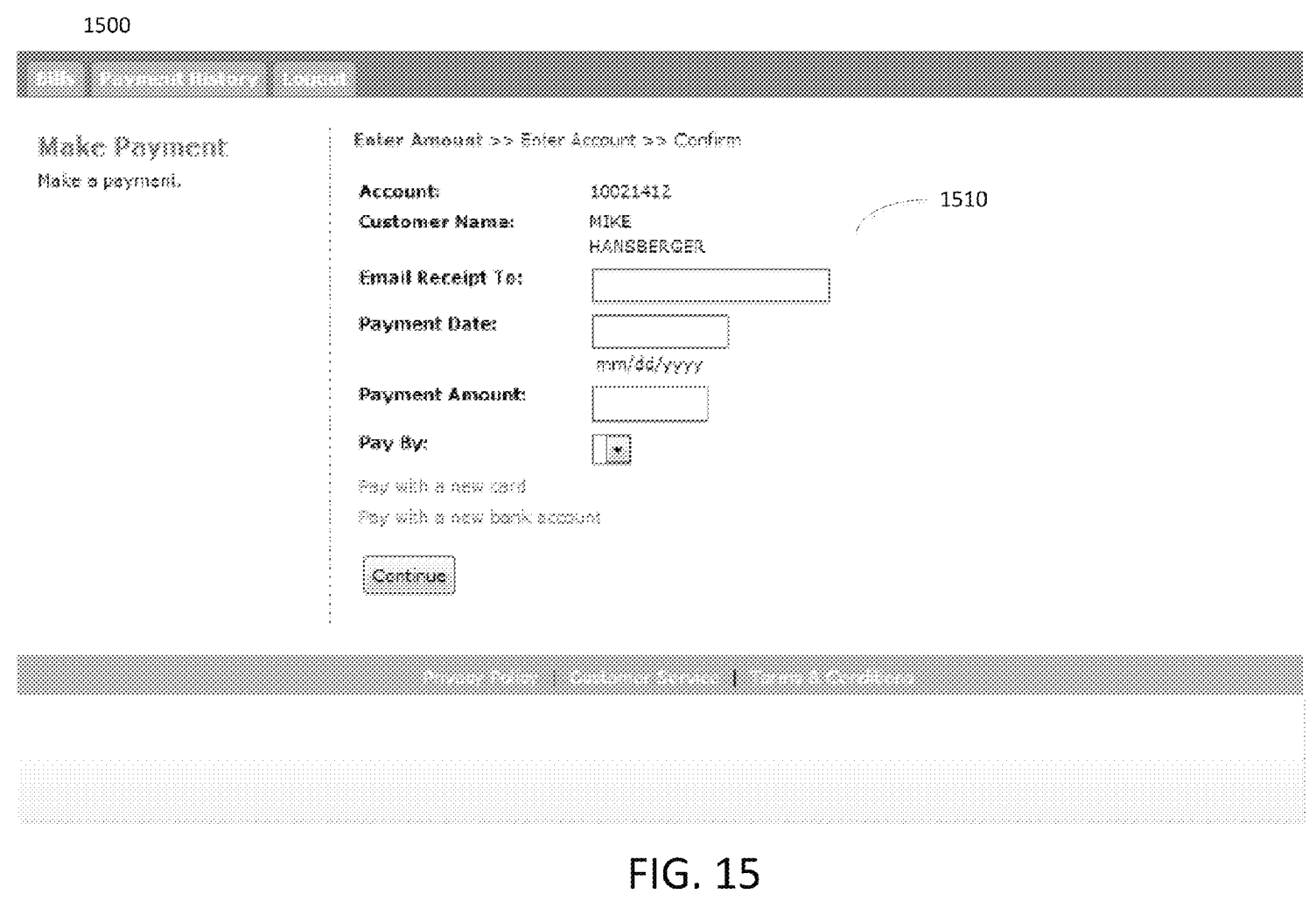

FIGS. 13-15 are example views provided by an state controller and view manager in accordance with some embodiments. Navigating between the example views show action performed by the state controller and the view manager as navigating from one view to another corresponds to transitioning through one or more states of the state machine (executing the customized biller EBPP workflow) by the state controller and/or view manager.

Referring to FIG. 13, a bill listing view 1300 is displayed by the view manager on a user interface (e.g. web browser). The bill listing view 1300 may list a number of active (e.g. pending) bills 1310 for a customer. The view manager may present the bill listing view 1300 by accessing context data models stored in memory (coupled to a computer server implementing the view manager) and presenting the context data model as the bill listing view 1300 according to the customized biller EBPP workflow.

In one embodiment, the customer may select to view a bill. Upon selecting to view a bill, the state controller may process the selection, and the biller EBPP workflow transitions to a next state of a state machine according to the state controller. Further, the state controller instructs the view manager to present a bill view 1400 as shown in FIG. 14. The bill view 1400 is presented when the second bill listed bill on FIG. 13 is selected to be viewed. The bill view 1400 may present several pieces of bill information 1410 including, but not limited to, the account identifier, invoice number, customer name, bill post date, bill due date, bill/invoice amount, balance due on account, minimum payment for the bill/account, and invoice description. Further, the customer may be able to see the previous view (e.g. web page) or select to pay the bill. The view manager may present the bill view 1400 by accessing context data models stored in memory (coupled to a computer server implementing the view manager) and presenting the context data model as the bill view 1400 according to the customized biller EBPP workflow.

Referring to FIG. 15, the customer has selected to pay the bill shown in FIG. 14. Upon selecting to pay the bill, the state controller may process the selection and the biller EBPP workflow transitions to a next state of a state machine according to the state controller. Further, the state controller instructs the view manager to present a bill payment view 1500 as shown in FIG. 15. The bill payment view 1500 may present several pieces of bill payment information 1510 including, but not limited to, account number, customer name, user inputted email address to receive receipt, payment date, payment amount, and selection of method of payment. Once the payment information is inputted into the bill payment view 1500 by the customer, the state controller may process the payment according to the customized biller EBPP workflow and transition to a next state in the state machine.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for electronic bill presentment and payment, comprising:
  presenting a user interface running on a computing device, for configuring an electronic bill presentment and payment (EBPP) system;
  receiving, by a remote computer server, one or more instructions from the said user interface to dynamically implement an electronic bill presentment and payment workflow in run time;
  generating, on the remote computer server, a state machine based on the instructions received from the user interface on the computing device such that the state machine implements the EBPP workflow, by provisioning one or more configuration parameters based on the one or more received instructions, the state machine including an action state and a view state such that:
    one or more action states, implemented by the remote computer server, executes a first set of business logic scripts to determine a next state of the state machine in implementing the EBPP workflow, and
    one or more view states, implemented by the remote computer server, executes a second set of business logic scripts to display a view to a payor;
  sending the first set of business logic scripts and the second set of business logic scripts to a sandbox processor executing on the remote computer server, the sandbox processor populating a sandbox context with the data used during processing of the first logic scripts and the second logic scripts, causing the sandbox context to restrict access to read and write to model data, set messages for a send user and affect a routing of the state machine; and activating, based on instructions in the received logic scripts, an update on the computing device that reflects the first set of business logic scripts and the second set of business logic scripts.

2. The method of claim 1, further comprising configuring one or more business logic scripts by the EBPP workflow configuration module to implement the EBPP workflow.

3. The method of claim 1, further comprising configuring one or more view templates by the EBPP workflow configuration module to implement the EBPP workflow.

4. The method of claim 1, further comprising:
configuring a decision state of the state machine which determines a next state of the state machine based on evaluating one or more configuration parameters; and
configuring an end state of the state machine which completes execution of the EBPP workflow and displays a view.

5. The method of claim 1, wherein the EBPP workflow is configured dynamically in real-time.

6. The method of claim 1, further comprising presenting a bill to a biller customer on a user interface based on the EBPP workflow.

7. The method of claim 1, further comprising accepting payment information from a biller customer.

8. The method of claim 7, further comprising processing payment based on the information received.

9. The method of claim 1, further comprising receiving one or more business logic scripts from a biller to configure the EBPP workflow.

10. The method of claim 9, wherein the one or more business logic scripts is at least one of groovy, javascript, beanshell, EL, and bsf.

11. The method of claim 1, further comprising:
receiving one or more additional instructions from a biller; and
modifying the EBPP workflow, state machine, and a payor workflow based on the one or more received additional instructions.

12. The method of claim 1, further comprising:
receiving one or more additional instructions from a biller; and
generating a new EBPP workflow, state machine, and a payor workflow based on the one or more received additional instructions.

13. The method of claim 1, further comprising configuring a user interface based on the EBPP workflow.

14. The method of claim 1, wherein generating the state machine includes configuring one or more view states and one or more action states.

15. The method of claim 14, further comprising mapping one or more views to be displayed on a user interface to the one or more view states.

16. The method of claim 1, further comprising configuring one or more state transitions between the one or more states based on the EBPP workflow.

17. The method of claim 1, further comprising determining the next state and having the state controller execute the next state.

18. A method for electronic bill presentment and payment, comprising:

presenting a user interface running on a computing device, for configuring an electronic bill presentment and payment (EBPP) system;

receiving, by a remote computer server, one or more instructions from the said user interface to dynamically implement an electronic bill presentment and payment workflow in run time; and generating, on the remote computer server, a state machine based on the instructions received from the user interface on the computing device such that the state machine implements the EBPP workflow, by provisioning one or more configuration parameters based on the one or more received instructions, the state machine including a view state such that the state machine executes one or more business logic scripts to:
determine a current view state of the state machine,
load view configuration for the current view state,
transmit the one or more business logic scripts mapped to the current view state to the sandbox processor on the remote computing server, the sandbox processor populating a sandbox context that restricts access to read and write to model data, sets messages for a send user and affects a routing of the state machine, and activate, based on instructions in the received logic scripts, an update to the view on the computing device to reflect the one or more business logic scripts.

19. The method of claim 18, further comprising populating one or more display fields with display data based on the configuration parameters.

20. The method of claim 19, further comprising presenting the one or more display fields and one or more input fields on the user interface within a view page.

21. The method of claim 20, further comprising attaching to the one or more input fields with one or more validation scripts.

22. The method of claim 18, further comprising presenting available messages intended for the a user.

23. The method of claim 18, further comprising at least one of:
adding one or more page-level scripts;
adding default Cascading Style Sheets (CSS) styles; and
adding custom CSS styles.

24. A method for electronic bill presentment and payment, comprising:

presenting a user interface running on a computing device, for configuring an electronic bill presentment and payment (EBPP) system;

receiving, by a remote computer server, one or more instructions from the said user interface to dynamically implement an electronic bill presentment and payment workflow in run time; and generating, on the remote computer server, a state machine based on the instructions received from the user interface on the computing device such that the state machine implements the EBPP workflow, by provisioning one or more configuration parameters based on the one or more received instructions, the state machine including one or more states such that the state machine;
determines a current state based on a previous state of the state machine and the transition from previous state;
executes the current state;
executes one or more business logic scripts configured by the EBPP workflow configuration module by the remote computer server to:

determine a next state in the state machine; and
transition to the next state in the state machine;

transmits the one or more business logic scripts mapped to the current state to a sandbox processor on the remote computing server, the sandbox processor populating a sandbox context that restricts access to read and write to model data, sets messages for a send user and affects a routing of the state machine; and activates, based on instructions in the received logic scripts, an update on the computing device that reflects the first set of business logic scripts and the second set of business logic scripts.

25. The method of claim 24, further comprising processing inputs received from a user interface that includes at least one of processing an input request, parsing input data from a user, configuring a data model, and validating input data.

26. The method of claim 24, further comprising receiving a response from the sandbox processor, the response based on the processing the one or more business logic scripts mapped to the current state.

27. The method of claim 24, further comprising populating data model based on processing the inputs and the response from the sandbox processor.

* * * * *